United States Patent [19]
Matsuzaki

[11] Patent Number: 5,406,388
[45] Date of Patent: Apr. 11, 1995

[54] DATA COMMUNICATION APPARATUS

[75] Inventor: Susumu Matsuzaki, Yokohama, Japan

[73] Assignee: Canon Kabushiki Kaisha, Tokyo, Japan

[21] Appl. No.: 895,611

[22] Filed: Jun. 9, 1992

[30] Foreign Application Priority Data

Jun. 11, 1991 [JP] Japan .................. 3-139094

[51] Int. Cl.$^6$ ............................... H04N 1/32
[52] U.S. Cl. ........................ 358/434; 370/32; 379/100
[58] Field of Search ............. 358/434; 379/90, 93, 379/100; 370/24, 29, 32, 32.1, 110.1

[56] References Cited

U.S. PATENT DOCUMENTS

| | | |
|---|---|---|
| 4,811,342 | 3/1989 | Huang ........................ 379/411 X |
| 4,841,521 | 6/1989 | Amada et al. ................ 370/31 |
| 4,890,316 | 12/1989 | Walsh et al. ................. 379/98 |
| 4,910,506 | 3/1990 | Yoshida et al. .............. 340/825 |
| 5,214,650 | 5/1993 | Renner et al. ............... 370/110.1 |

Primary Examiner—Bentsu Ro
Attorney, Agent, or Firm—Fitzpatrick, Cella, Harper & Scinto

[57] ABSTRACT

A data communication apparatus for performing a communication of a procedure signal at a low transmission speed, and performing a communication of data at a high transmission speed, includes a discrimination unit for discrimination whether or not a received signal is an echo signal, and a detection unit for detecting reception of one of high- and low-speed signals according to a discrimination result of the discrimination unit at a timing at which the high- and low-speed signals in communication may be received.

7 Claims, 8 Drawing Sheets

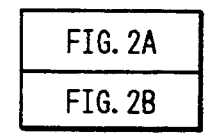
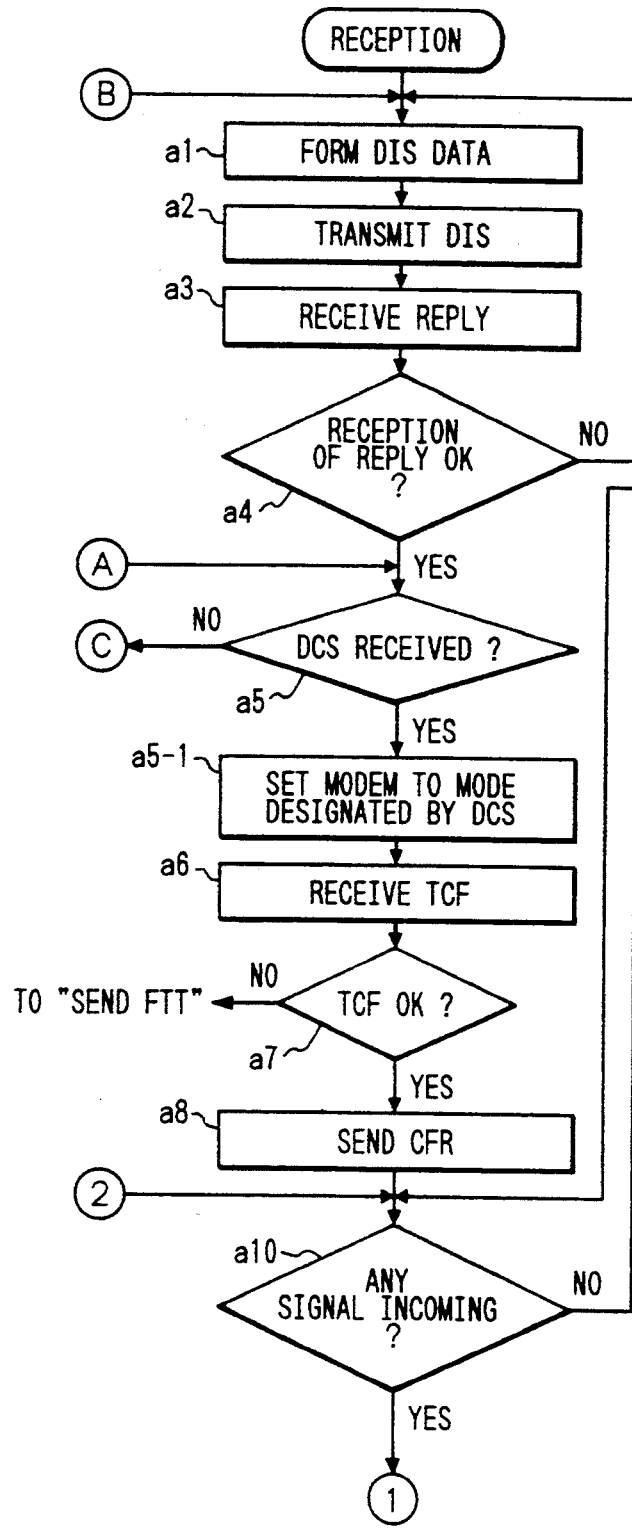
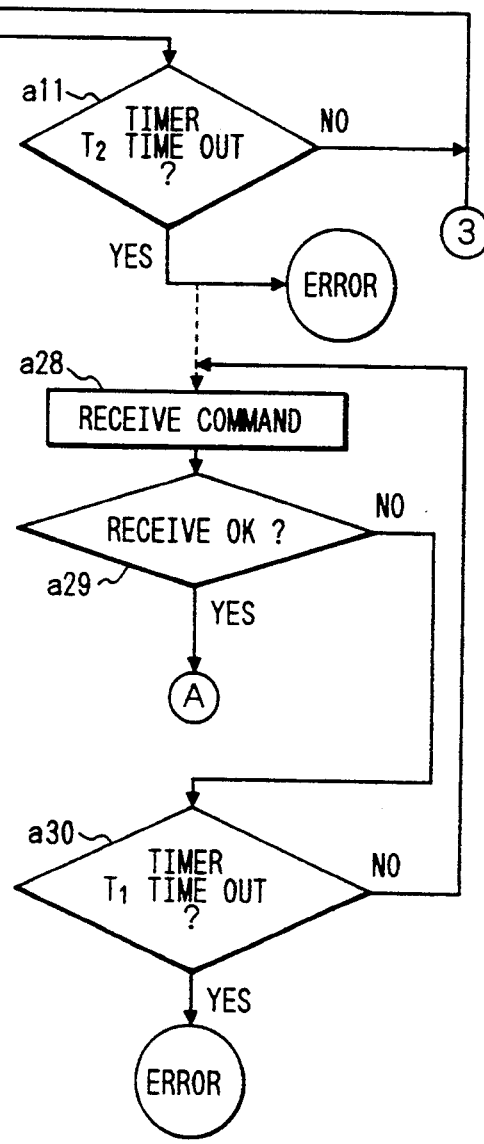

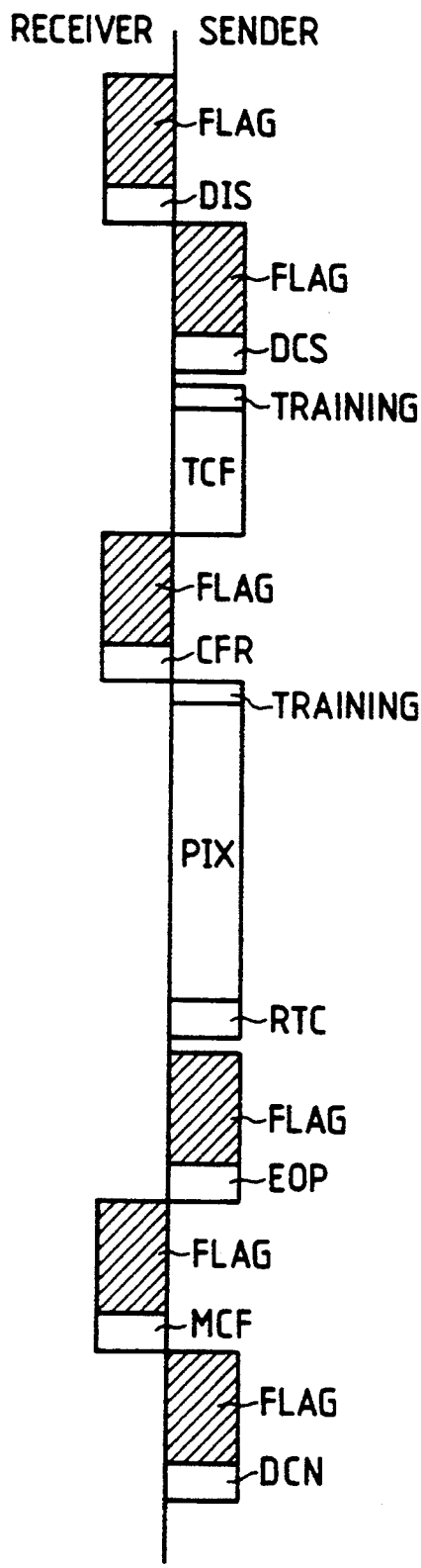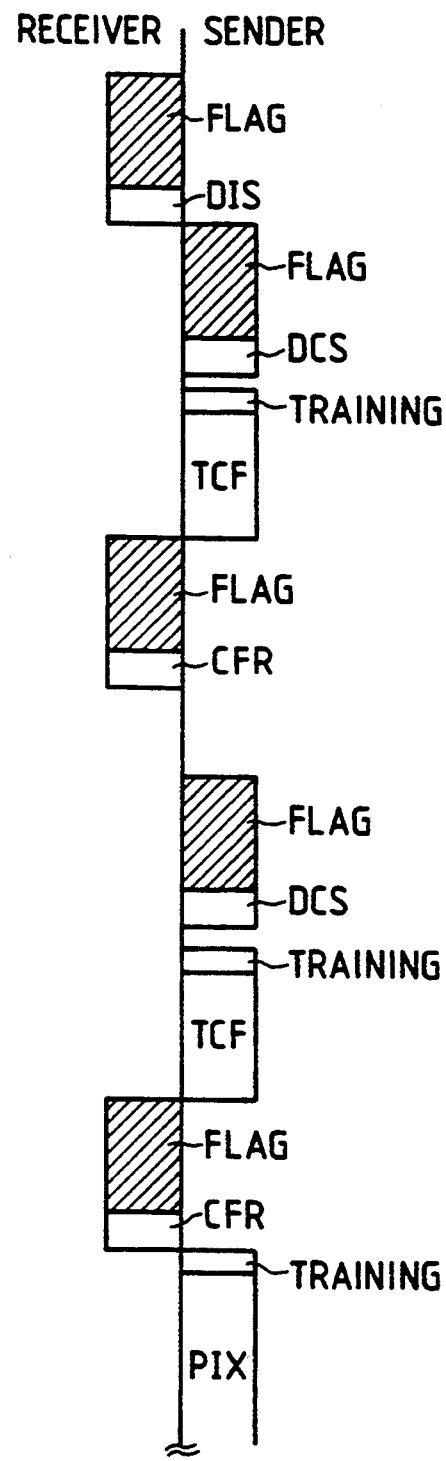

DATA COMMUNICATION APPARATUS

BACKGROUND OF THE INVENTION

1. Field of the Invention

The present invention relates to a data communication apparatus, which performs communications of procedure signals at a low transmission speed, and performs communications of data at a high transmission speed.

2. Related Background Art

As a conventional apparatus of this type, for example, a facsimile apparatus of the G3 standards of the CCITT recommendation is known. The G3 facsimile apparatus performs a facsimile communication procedure at a transmission speed of 300 bps using a modem complying with the CCITT recommendation V21 standards, while it performs communications of image information at a transmission speed of 2,400 bps to 9,600 bps using a modem complying with the V27ter or V29 standards. The G3 facsimile apparatus performs communications while switching the transmission speed between high- and low-speed modes. As shown in FIGS. 5 and 6, the G3 facsimile apparatus has timings (to be referred to as nodes F hereinafter) at which high- and low-speed signals may be received. FIG. 5 shows a normal procedure, wherein a sender sends a PIX signal (V29 or V27ter) as an image signal in response to a CFR signal (V21), which indicates the end of reception preparation at a receiver. FIG. 6 shows a case wherein the sender sends a DCS signal for requesting a re-send mode since it failed to receive the CFR signal sent from the receiver.

Along with development of various functions, modems used in recent facsimile apparatuses incorporate all the modem modes such as V29, V27ter, V21, and the like required for facsimile communications. Some of these modems have a function of informing the presence of a signal energy, and a function of informing reception of a training signal of V29 or V27ter signals in the V29 or V27ter mode. When such a modem is used, a technique for, when a training signal cannot be received within a predetermined period of time (about 500 ms) after an ON timing of the signal energy, determining a low-speed signal in the V21 mode is used (since a V21 preamble signal continues for 1 sec in the facsimile procedure signals, reception can be made even when discrimination requires a long period of time). As a facsimile apparatus using such a technique, one disclosed in U.S. Pat. No. 4,910,506 is known.

Some other modems have a function of informing detection of a V21 mode signal in the V29 or V27ter mode to the control side. A modem of this type stands by in the V29 or V27ter mode, and re-sets the modem mode to the V21 mode upon reception of information indicating detection of the V21 mode signal so as to receive the V21 signals (in the modem of this type, the detection capability of the V21 signals is very important).

In the above-mentioned two prior arts, in a line such as an international line suffering from an echo, since the V21 mode signal is actually returned as an echo at a T30 node F, the control exits the high-speed V29 mode, and starts reception of V21 signals. Even in such a case, when the echo delay time is long, since a CFR signal returned as an echo can be received, as shown in FIG. 7, it can be recognized as an echo of its own station signal. However, the echo delay time varies depending on a communication channel at that time. Therefore, when the delay time is short, the V21 mode signal cannot be recognized as an echo of its own station signal, as shown in FIG. 8, and the control remains switched to the V21 mode. As a result, the training signal of a PIX signal (V29) cannot be received.

SUMMARY OF THE INVENTION

It is an object of the present invention to improve a data communication apparatus in consideration of the above-mentioned problems.

It is another object of the present invention to provide a data communication apparatus, which can perform a proper data communication even when a data communication is performed using a line that may cause an echo.

It is still another object of the present invention to provide a communication apparatus which can properly switch between a high-speed data communication mode and a low-speed procedure signal communication mode even when a data communication is performed using a line that may cause an echo.

Other objects of the present invention will become apparent from the following detailed description of the preferred embodiments taken in conjunction with the accompanying drawings.

BRIEF DESCRIPTION OF THE DRAWINGS

FIG. 5 is a chart showing a communication sequence in a G3 apparatus;

FIG. 6 is a chart showing a communication sequence in the G3 apparatus;

DETAILED DESCRIPTION OF THE PREFERRED EMBODIMENTS

An embodiment of the present invention will be described below with reference to the accompanying drawings.

Figure 1:
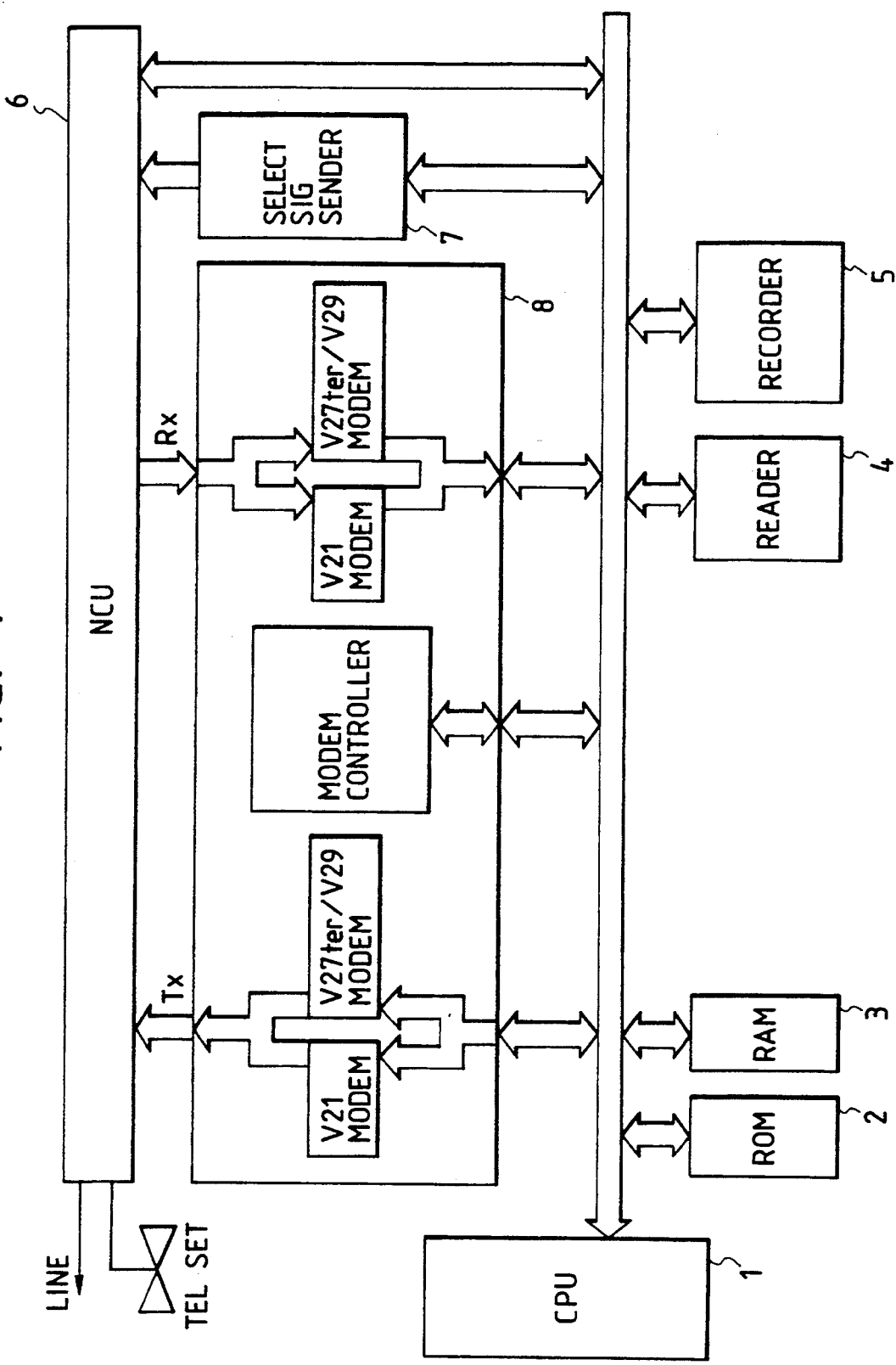
FIG. 1 is a block diagram showing a system arrangement of a facsimile apparatus according to an embodiment of the present invention.

FIG. 1 is a block diagram showing a system arrangement of a facsimile apparatus according to an embodiment of the present invention.

A microcomputer (CPU) 1 controls the overall system. The CPU 1 executes a control operation according to a program stored in a ROM 2. A RAM 3 is used as a work area for the CPU 1, and is also used as a buffer for data of, e.g., procedure signals and image signals. An NCU (network control unit) 6 sends a signal from a modem 8 and a select signal sender 7 onto a line under the control of the CPU 1. The NCU 6 amplifies a signal from the line to a proper signal level, and supplies the amplified signal to the modem 8.

The modem 8 incorporates modems having different modes such as V21, V29, V27ter modes, and the like. One of these modes can be enabled under the control of the CPU 1. After a mode is set, the modem 8 modulates data received from the CPU 1 according to the selected mode. The modulated data is sent onto the line through the NCU 6, as described above. Contrary to this, a signal from the line is input to the modem 8 through the NCU 6, and is demodulated according to a mode set in advance by the CPU 1. The demodulated data is transferred from the modem 8 to the CPU 1.

When a calling signal (CI signal) of 16 Hz or 1,300 Hz is received from the line, the signal is detected by the NCU 6, and the CPU 1 is enabled. When the CPU 1 detects that the CI signal is input, it executes a reception program. In this manner, the NCU 6 closes the line although not shown in the flow chart shown in FIG. 2.

The reception operation will be described below with reference to the flow chart shown in FIG. 2.

Figure 3:
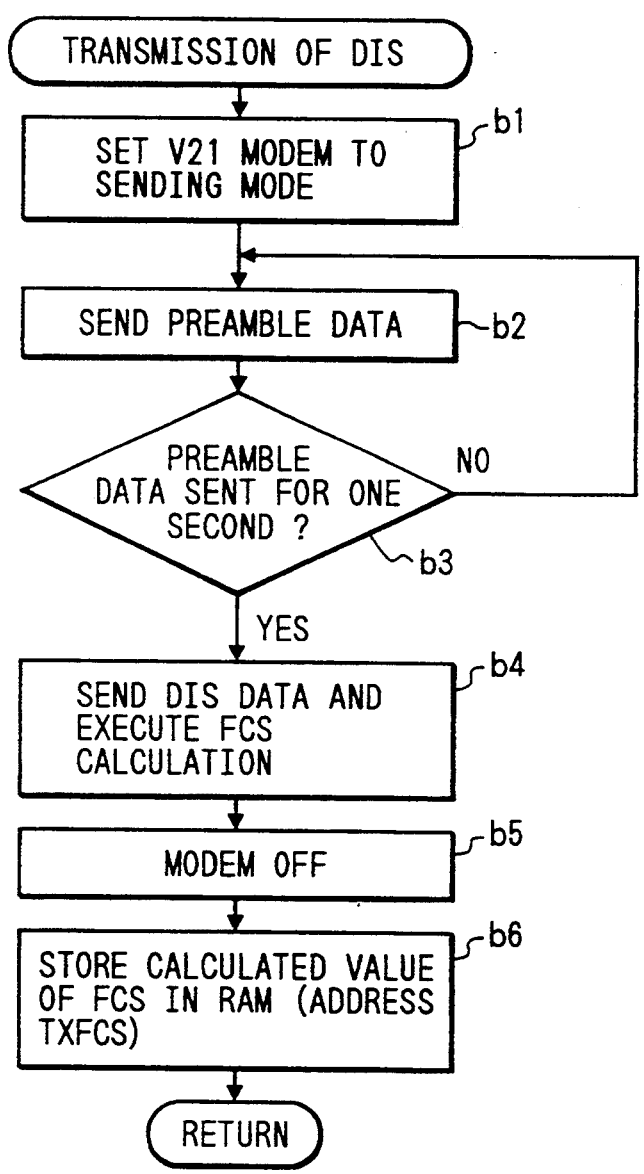
FIG. 3 is a flow chart showing a DIS transmission routine.

In steps $a1$ and $a2$, a DIS signal (digital identification signal) for stating the reception capability of its own station is transmitted. FIG. 3 shows the detailed flow of step $a2$.

When the control enters the DIS signal transmission routine, a V21 transmission mode is set in the modem 8 in step $b1$. In step $b2$, preamble data are transferred from the CPU 1 to the modem 8. The preamble data are modulated by the modem 8, and are sequentially transmitted onto the line through the NCU 6. After the preamble is transmitted for 1 sec according to the CCITT T30 recommendation (step $b3$), data formed in step $a1$ in FIG. 2 are sequentially transmitted to the modem 8 like the preamble data while converting these data into an HDLC format (including a calculation of an FCS (flag check sequence)) in step $b4$. After completion of transmission of all the data is detected, the transmission mode of the modem 8 is switched to an OFF state in step $b5$.

In step $b6$, the FCS value calculated in step $b4$ is stored at an address TXFCS of the RAM 3. These procedure steps are executed not only when the DIS signal is transmitted but also for all the procedure signals.

Figure 2B:
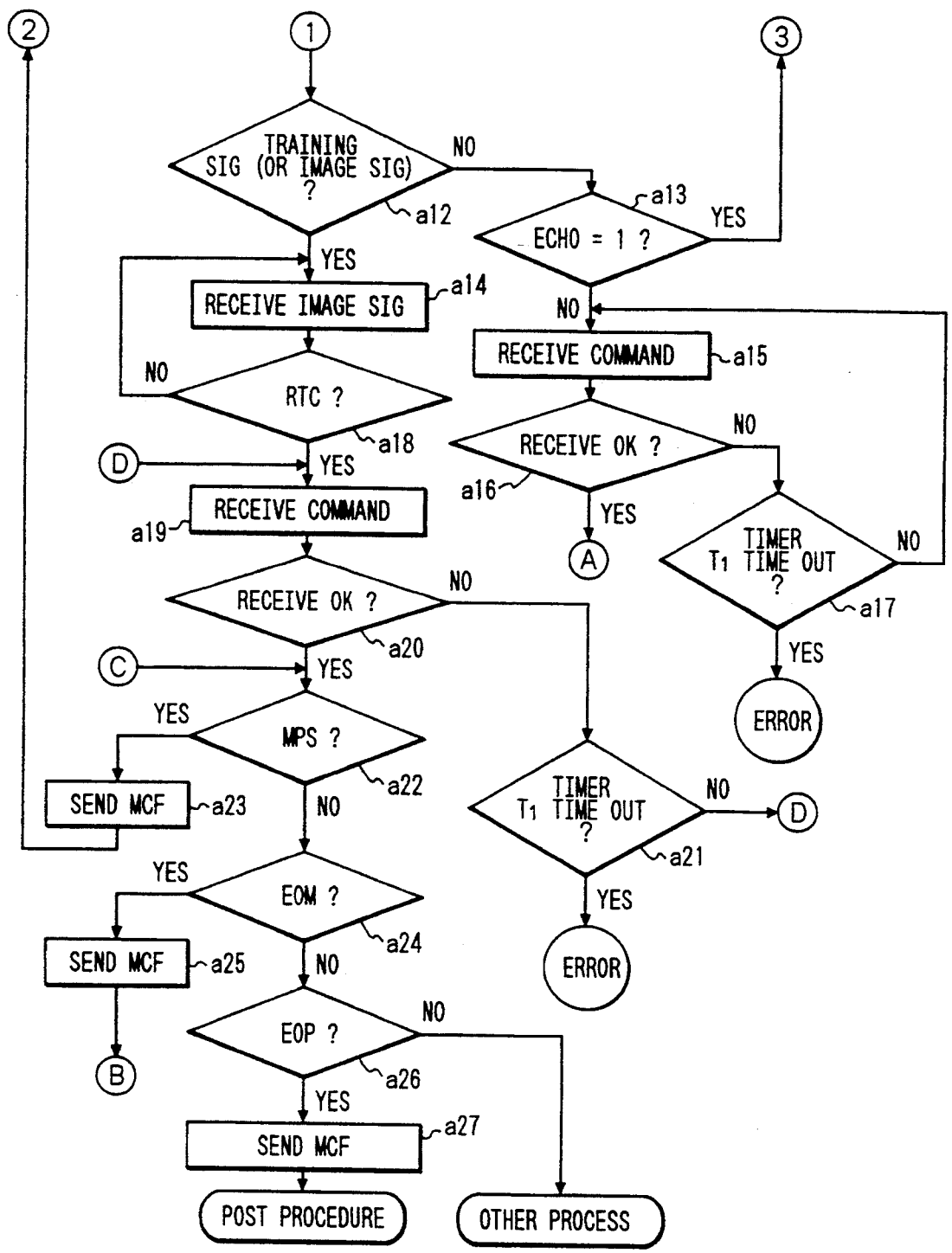
FIG. 2 (including FIGS. 2A and 2B) is a flow chart showing a control operation of a CPU of this embodiment.

After the transmission of the DIS signal is completed, as described above, a reply signal is received in step $a3$ In FIG. 2.

In the reply reception routine, when no significant signal is received, the DIS signal is transmitted, and the loop of these steps (steps $a1$, $a2$, $a3$, and $a4$) is repeated for a time T1.

Figure 4:
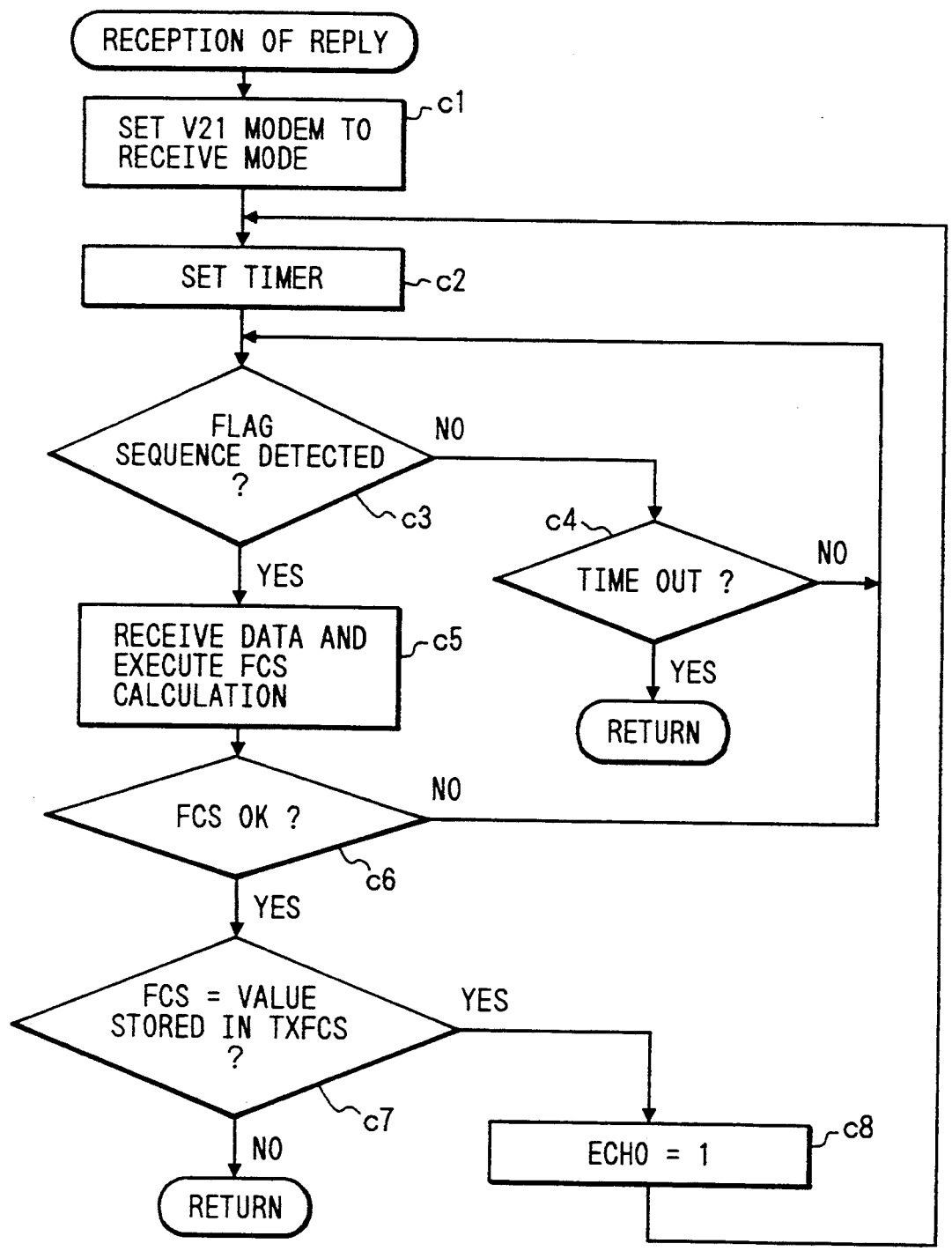
FIG. 4 is a flow chart showing a reply reception routine.
Figure 8:
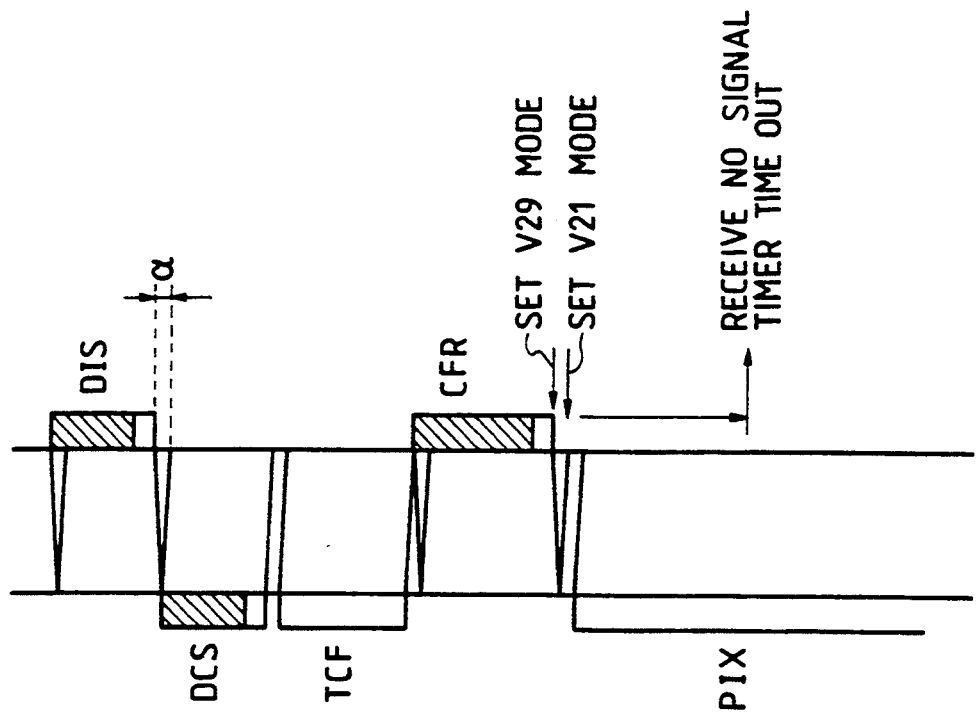
FIG. 8 is a chart showing the conventional communication.
Figure 7:
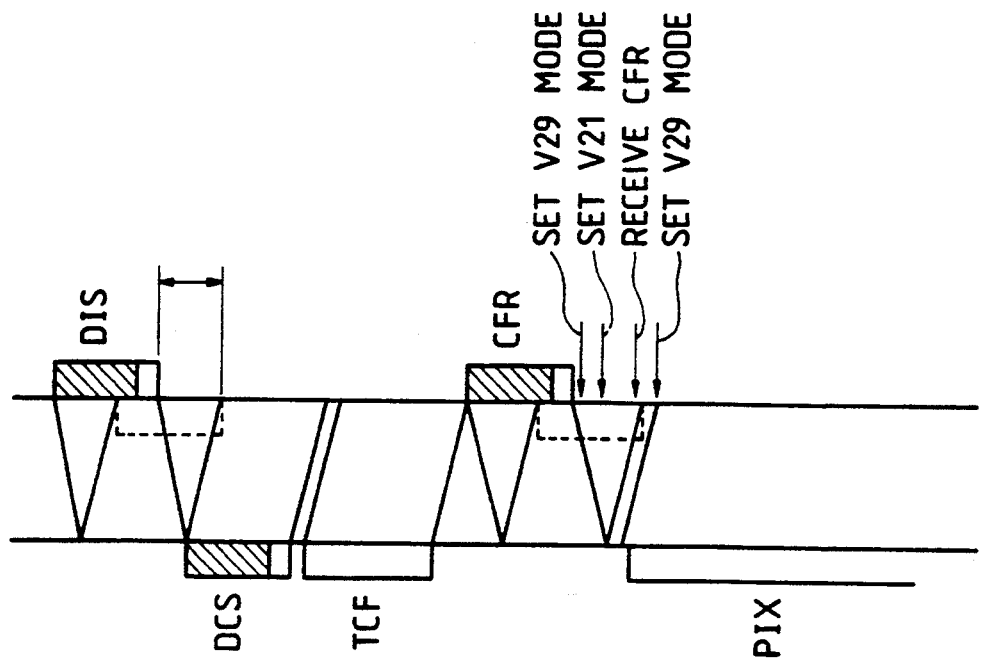
FIG. 7 is a chart showing a conventional communication.

FIG. 4 shows the detailed flow of the reply reception routine in step $a3$. In step $c1$, the modem is set in a V21 receive mode. In step $c2$, a timer is set (normally, 3.5 sec in an auto receive mode). More specifically, for this period of time, the control waits for a preamble signal of a command in response to the DIS signal transmitted previously. When the timer causes a time-out state in step $c4$, the control exits this subroutine, and the DIS signal is transmitted. If the preamble signal (flag sequence) is detected in step $c3$, data are received in step $c5$. In step $c5$, demodulated data are sequentially stored in the RAM 3, and an FCS calculation is executed. If the FCS transmitted at the end of a communication is equal to the value calculated at the receiver side, it is determined in step $c6$ that reception is successful. Furthermore, in step $c7$, the FCS value calculated upon transmission of the DIS signal, and stored at the address TXFCS of the RAM 3 in step $a2$ is compared with the currently received FCS value. If the two values are equal to each other, it is determined that the received signal is an echo of the DIS signal. In step $c8$, a message indicating a line with an echo is stored by setting a flag at an address ECHO of the RAM 3.

In this manner, since it is determined that the received signal is an echo, reception is performed again. At this time, the reception timer is set again. Since the timer is set again, the timing for transmitting the next DIS signal is prolonged, thus avoiding a signal collision (with a DCS signal) caused by the echo delay time.

When the reply signal is received, the FCS calculation is successful, and it is determined that the received signal is not an echo, it is determined that the reply reception is successful, and the flow advances from step $a4$ to step $a5$ in FIG. 2. If it is determined in step $a5$ that the received signal is a DCS signal (digital command signal), the modem is set in a mode (transmission speed) commanded by the DCS signal in step $a5$-1. In step $a6$, a TCF (training check) signal is received. If the received command is other than the DCS, the flow advances to step $a22$. If it is determined in step $a7$ that the TCF is satisfactory, a CFR (reception ready confirmation) signal is transmitted in step $a8$ (the CFR is transmitted in the same procedure as in transmission of the DIS signal). At this time, a T1 timer (e.g., 35 sec) and a T2 timer (e.g., 6 sec) are started.

Different operations are performed depending on a line with or without an echo. The line without an echo will be described below. In steps $a10$, $a11$, $a12$, $a13$, $a15$, $a16$, and $a17$ (node F), there are two cases even for a line without an echo, i.e., a case wherein a high-speed image signal (or a training signal) is input and a case wherein a low-speed command signal as a re-transmitted command is input. The latter case occurs when a CFR signal transmitted from a receiver to a sender or an MCF (message confirmation) signal to be transmitted in steps $a23$, $a25$, and $a27$ cannot be normally received by the sender, and the sender transmits a command signal such as a DCS, MPS (multi-page signal), EOM (end of message), or the like. In steps $a10$ and $a11$, the presence/absence of energy on the line is detected to discriminate if any incoming signal from the line is detected. If an incoming signal from the line is detected, it is checked in step $a12$ if the incoming signal from the line is a training signal (or an image signal). If the training signal is detected, an image signal following the training signal is received in step $a14$. On the other hand, if the incoming signal from the line is not a training signal but a re-transmitted command signal, the flow advances from step $a12$ to $a13$ to check if the line currently in communication is a line with or without an echo. In this case, since the line is a line without an echo, the modem is set in a V21 command receive mode in steps $a15$, $a16$, and $a17$, and command reception is performed until the T1 timer causes a time-out state. If any command is received, the flow returns to step $a5$.

In this manner, in the case of the line without an echo, if not a training signal but a command signal is received before the T2 timer (6 sec) causes a time-out state, a command signal receive mode is started.

On the other hand, in the case of the line with an echo, an echo is recognized in the reply reception routine in step $a3$, and "1" is set at the address ECHO of the RAM 3, as described above. Thus, a loop (steps $a10$ to $a13$) returning from step $a13$ to step $a10$ is formed, and during the time measurement of the T2 timer, even when an echo of the transmitted CFR or MCF signal is received, the flow does not advance to command reception in step a15. Therefore, a communication is not influenced by the echo of the line. When a training signal is received during the time measurement of the T2 timer, an image signal can be normally received.

When not a high-speed V29 or V27ter signal but a re-transmitted V21 command signal (procedure signal) is received at the node F, an error occurs. In this case, however, in steps a28, a29, and a30, the modem is set to receive a V21 low-speed signal, and a reception check operation of a command signal is performed until the T1 timer causes a time-out state. Thus, a re-transmitted command can be received, and a communication can be continued.

When the flow advances from step a12 to a14 to receive an image signal, reception of the image signal is performed until an RTC signal (a Return To Control signal; successively transmitted six End of line signals) is detected in step a18. Upon reception of the RTC signal, the modem is set in a V21 low-speed signal receive mode to receive a V21 command. In steps a19, a20, and a21, a reception check operation of a command signal is performed until the T1 timer causes a time-out state. If any command signal is received in steps a19 to a21, it is checked in steps a22, a24, and a26 if the received command signal is an MPS (multi-page signal), an EOM (end of message), or an EOP (end of procedure). If the received command signal is none of these command signals, the flow advances to other process.

If it is determined in step a22 that the received command signal is the MPS, it is checked in step a14 and a18 if an image signal for one page can be normally received. If the image signal for one page can be normally received, an MCF (message confirmation) signal is transmitted in step a23, and the same receive mode (e.g., the modem speed, and the like) as that of the previous image signal is set. The flow then returns to step a10. On the other hand, if the image signal for one page cannot be normally received, an RTN (re-train negative) signal is transmitted.

If it is determined in step a24 that the received command signal is the EOM, the MCF is transmitted in step a25 like in step a23, and the flow returns to step a1 to transmit the DIS signal so as to set a mode again.

If it is determined in step a26 that the received command signal is the EOP, the MCF is transmitted in step a27, and thereafter, a post-procedure is executed to release the line.

Figure 9:
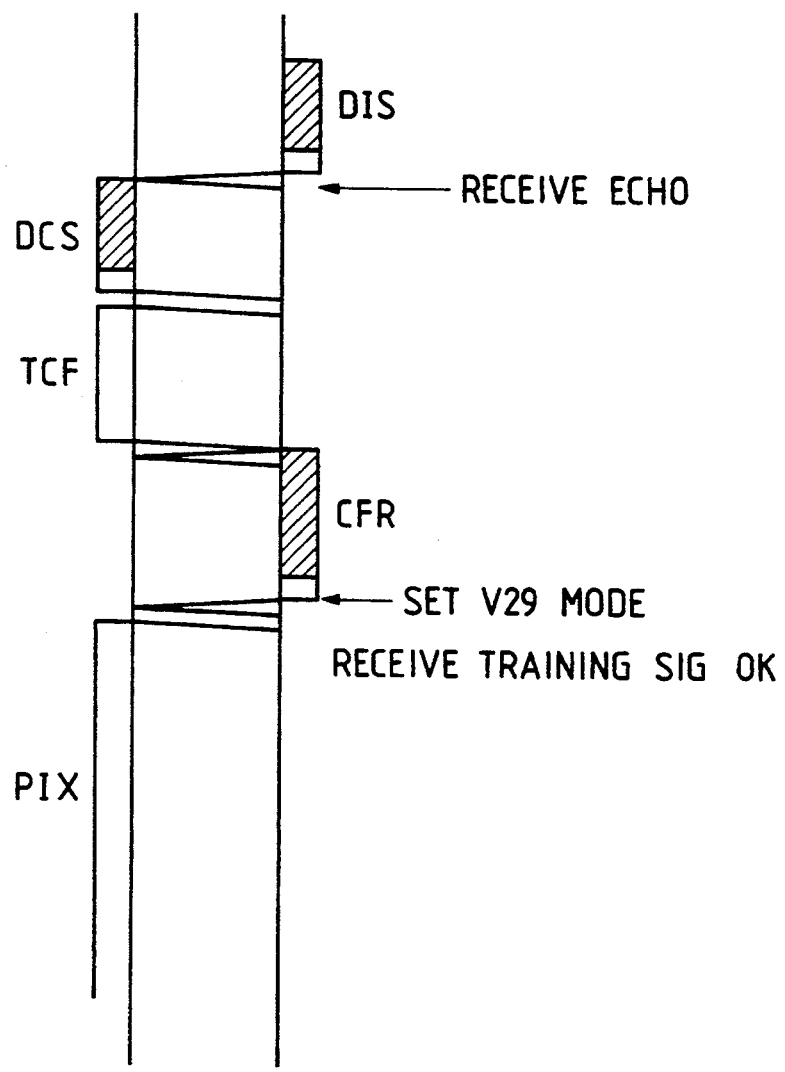
FIG. 9 is a chart showing a communication according to this embodiment.

FIG. 9 shows a successful communication using a line with an echo.

In the above embodiment, an echo signal is detected in such a manner that an HDLC format is formed by the control (CPU) side of the modem, its FCS is stored, and the stored FCS is compared with that of received signal data.

However, some recent modems have a function of HDLC-formatting data as long as they receive data. In such a modem, although the FCS calculation may be performed by the main control side, it results in repetitive operations. Thus, the FCS calculation may be performed by the modem, and in an echo check operation, the total sum of all the data may be calculated and stored, and the total sum of received data may be calculated and compared with the stored sum.

In addition, when the storage capacity is sufficient, all the transmitted data may be stored, and may be compared with all the received data, thus attaining an echo check operation.

As a further simple method, when it is detected that a DIS signal is sent back in response to the DIS signal or a CFR is sent back in response to the CFR, a line with an echo may be determined.

As described above, an echo discrimination means is arranged, and in a communication in which an echo is detected even once, one of high- and low-speed signals is monitored and received at a node (timing) at which the high- and low-speed signals may be input. Thus, a phenomenon that high-speed signals cannot be received at all due to a signal discrimination error can be prevented even on a line with an echo. In addition, on a normal line free from an echo, a communication can be performed without any influence.

The present invention is not limited to the above embodiment, and various modifications may be made.

What is claimed is:

1. A data communication apparatus for performing a communication of a procedure signal at a low transmission speed, and performing a communication of data at a high transmission speed, comprising:
   discrimination means for discrimination whether or not a received signal is an echo signal; and
   detection means for detecting reception of one of high- and low-speed signals according to a discrimination result of said discrimination means at a timing at which the high- and low-speed signals in communication are receivable.

2. An apparatus according to claim 1, wherein said detection means detects reception of the high-speed signal for a predetermined period of time.

3. An apparatus according to claim 2, wherein when said detection means receives the high-speed signal within the predetermined period of time, a high-speed data communication is performed.

4. An apparatus according to claim 1, wherein when said discrimination means discriminates that the echo signal is received, reception of the high-speed signal is detected for a predetermined period of time, and when said discrimination means discriminates that no echo signal is received, reception of the high- and low-speed signals is detected for the predetermined period of time.

5. A data communication apparatus for performing a communication of a procedure signal at a low transmission speed, and performing a communication of data at a high transmission speed, comprising:
   discrimination means for detecting whether or not a received signal is an echo signal of a procedure signal transmitted from its own apparatus, and discriminating based on a detection result whether or not a line for performing a communication is a line with an echo; and
   control means for detecting reception of one of high- and low-speed signals according to a discrimination result of said discrimination means at a timing at which the high- and low-speed signals in communication are receivable, and performing data communication control according to the detection result.

6. An apparatus according to claim 5, wherein when said discrimination means discriminates that the line is the line with an echo, said control means detects reception of the high-speed signal for a predetermined period of time at the timing, and when said discrimination means discriminates that the line is the line without an echo, said control means detects reception of the high- and low-speed signals for the predetermined period of time at the timing.

7. A data communication method for performing a communication of a procedure signal at a low transmission speed, and performing a communication of data at a high transmission speed, comprising the steps of:
   detecting whether or not a line for performing a communication is a line with an echo; and
   selecting whether reception of a high-speed signal is detected or reception of high- and low-speed signals is detected according to the detection result for a predetermined period of time at a timing at which the high- and low-speed signals are detectable in a data communication sequence.

* * * * *